United States Patent
Locke et al.

(10) Patent No.: US 9,145,078 B2
(45) Date of Patent: Sep. 29, 2015

(54) VEHICLE SEAT HEAD RESTRAINT ACTUATION

(75) Inventors: Gerald S. Locke, Lake Orion, MI (US); Arjun Yetukuri, Rochester Hills, MI (US); Alex Taylor, Coventry (GB)

(73) Assignee: Lear Corporation, Southfield, MI (US)

( * ) Notice: Subject to any disclaimer, the term of this patent is extended or adjusted under 35 U.S.C. 154(b) by 338 days.

(21) Appl. No.: 13/592,691

(22) Filed: Aug. 23, 2012

(65) Prior Publication Data

US 2014/0054944 A1    Feb. 27, 2014

(51) Int. Cl.
| | |
|---|---|
| A47C 1/02 | (2006.01) |
| A47C 7/62 | (2006.01) |
| A47C 31/00 | (2006.01) |
| B60N 2/48 | (2006.01) |
| B60N 2/02 | (2006.01) |
| B60N 2/22 | (2006.01) |
| B60N 2/44 | (2006.01) |

(52) U.S. Cl.
CPC ............ B60N 2/4829 (2013.01); B60N 2/0232 (2013.01); B60N 2/22 (2013.01); B60N 2/4832 (2013.01); B60N 2/4852 (2013.01); B60N 2/4855 (2013.01); B60N 2002/0272 (2013.01); B60N 2002/445 (2013.01); B60N 2002/4891 (2013.01)

(58) Field of Classification Search
CPC ............... B60N 2/4832; B60N 2/4855; B60N 2002/4891; B60N 2/4858; B60N 2/487; B60N 2/002
USPC ........ 297/61, 378.1, 217.3, 408, 410, 378.12; 701/49
See application file for complete search history.

(56) References Cited

U.S. PATENT DOCUMENTS

| | | | | |
|---|---|---|---|---|
| 4,222,608 | A * | 9/1980 | Maeda .......................... | 297/410 |
| 4,807,934 | A * | 2/1989 | Sakakibara et al. .......... | 297/403 |
| 4,813,721 | A * | 3/1989 | Mora .............................. | 296/68 |
| 4,977,973 | A * | 12/1990 | Takizawa ...................... | 180/271 |
| 5,003,240 | A * | 3/1991 | Ikeda ............................ | 318/603 |

(Continued)

FOREIGN PATENT DOCUMENTS

| | | |
|---|---|---|
| DE | 10104386 A1 | 7/2002 |
| DE | 102004038320 A1 | 3/2006 |

(Continued)

OTHER PUBLICATIONS

Chinese Office Action for corresponding Application No. 201310361998.3, mailed Jun. 2, 2015, 10 pages.

*Primary Examiner* — Daniel J Troy
*Assistant Examiner* — Kimberley S Wright
(74) *Attorney, Agent, or Firm* — Brooks Kushman P.C.

(57) ABSTRACT

A vehicle seat controller is provided and configured to receive an input indicative of a seat back having pivoted forward to a predetermined position. The vehicle seat controller conveys a signal to an actuator to pivot a head restraint in response to the input. Another vehicle seat controller is provided and configured to receive an input indicative of a seat back having pivoted rearward to a predetermined position. The vehicle seat controller conveys a signal to an actuator to pivot a head restraint in response to the input. Another vehicle seat controller is provided and configured to receive an input indicative of a rear seat assembly having adjusted to a slouch position. The vehicle seat controller conveys a signal to an actuator to stow a head restraint of a front seat assembly in response to the input.

11 Claims, 4 Drawing Sheets

(56) References Cited

U.S. PATENT DOCUMENTS

| | | | |
|---|---|---|---|
| 5,006,771 A | 4/1991 | Ogasawara | |
| 5,095,257 A * | 3/1992 | Ikeda et al. | 318/568.1 |
| 5,229,694 A * | 7/1993 | Takahara et al. | 318/265 |
| 5,466,001 A * | 11/1995 | Gotomyo et al. | 280/730.1 |
| 5,681,079 A * | 10/1997 | Robinson | 297/61 |
| 5,918,940 A | 7/1999 | Wakamatsu et al. | |
| 5,975,637 A * | 11/1999 | Geuss et al. | 297/391 |
| 6,192,565 B1 * | 2/2001 | Tame | 297/61 |
| 6,390,558 B2 | 5/2002 | Fischer et al. | |
| 6,485,096 B1 * | 11/2002 | Azar et al. | 297/61 |
| 6,789,846 B2 * | 9/2004 | Humer et al. | 297/216.12 |
| 6,860,564 B2 * | 3/2005 | Reed et al. | 297/408 |
| 6,962,392 B2 * | 11/2005 | O'Connor | 297/61 |
| 6,983,995 B1 * | 1/2006 | Veine et al. | 297/391 |
| 7,118,178 B2 * | 10/2006 | Daniels | 297/378.1 |
| 7,145,263 B2 * | 12/2006 | Nathan et al. | 307/10.1 |
| 7,185,950 B2 * | 3/2007 | Pettersson et al. | 297/216.12 |
| 7,210,734 B1 | 5/2007 | Yetukuri et al. | |
| 7,232,187 B1 * | 6/2007 | Sundararajan et al. | 297/410 |
| 7,243,996 B2 * | 7/2007 | Daniels | 297/378.12 |
| 7,258,400 B2 * | 8/2007 | Yamada | 297/378.12 |
| 7,344,189 B2 * | 3/2008 | Reed et al. | 297/61 |
| 7,367,626 B2 * | 5/2008 | Lawall et al. | 297/410 |
| 7,369,928 B2 * | 5/2008 | Wang et al. | 701/49 |
| 7,441,821 B2 * | 10/2008 | Yetukuri et al. | 296/63 |
| 7,484,808 B2 | 2/2009 | Yetukuri et al. | |
| 7,556,306 B2 * | 7/2009 | Yetukuri et al. | 296/63 |
| 7,648,206 B2 * | 1/2010 | Wieclawski | 297/378.12 |
| 7,878,596 B2 * | 2/2011 | Brunner et al. | 297/410 |
| 7,883,144 B2 * | 2/2011 | Brunner | 297/61 |
| 8,002,356 B2 * | 8/2011 | Lutzka et al. | 297/408 |
| 8,061,777 B2 * | 11/2011 | Jensen | 297/391 |
| 8,126,617 B2 * | 2/2012 | Yetukuri et al. | 701/49 |
| 8,152,242 B2 * | 4/2012 | Yetukuri et al. | 297/408 |
| 8,182,037 B2 * | 5/2012 | Jeong et al. | 297/331 |
| 8,226,170 B2 * | 7/2012 | Lutzka et al. | 297/408 |
| 8,231,177 B2 * | 7/2012 | Jammalamadaka et al. | 297/408 |
| 8,444,224 B2 * | 5/2013 | Maeda et al. | 297/341 |
| 8,457,846 B2 * | 6/2013 | Fischer et al. | 701/49 |
| 8,556,342 B2 * | 10/2013 | Tache et al. | 297/217.3 |
| 8,662,578 B2 * | 3/2014 | Szybisty et al. | 297/61 |
| 8,672,399 B2 * | 3/2014 | Brunner et al. | 297/61 |
| 8,672,409 B2 * | 3/2014 | Yetukuri et al. | 297/403 |
| 8,864,209 B2 * | 10/2014 | White et al. | 296/65.01 |
| 2002/0079723 A1 | 6/2002 | Risch et al. | |
| 2003/0090133 A1 * | 5/2003 | Nathan et al. | 297/217.3 |
| 2005/0156456 A1 | 7/2005 | Robinson et al. | |
| 2006/0250016 A1 * | 11/2006 | Wang et al. | 297/408 |
| 2007/0114810 A1 * | 5/2007 | Yetukuri et al. | 296/65.01 |
| 2007/0114822 A1 * | 5/2007 | Yetukuri et al. | 297/217.3 |
| 2008/0296950 A1 * | 12/2008 | Wieclawski | 297/378.12 |
| 2008/0315653 A1 | 12/2008 | Brunner et al. | |
| 2009/0002184 A1 * | 1/2009 | Lenneman et al. | 340/665 |
| 2009/0248255 A1 * | 10/2009 | Mattson et al. | 701/49 |
| 2010/0179728 A1 * | 7/2010 | Yetukuri et al. | 701/45 |
| 2010/0219670 A1 * | 9/2010 | Jammalamadaka et al. | 297/408 |
| 2011/0062737 A1 * | 3/2011 | Kroener | 296/65.08 |
| 2011/0137529 A1 * | 6/2011 | Locke et al. | 701/49 |
| 2012/0235459 A1 * | 9/2012 | Yetukuri et al. | 297/391 |
| 2013/0049429 A1 * | 2/2013 | Yetukuri et al. | 297/408 |
| 2013/0093218 A1 * | 4/2013 | Yetukuri et al. | 297/61 |
| 2014/0333098 A1 * | 11/2014 | DeForest | 297/61 |

FOREIGN PATENT DOCUMENTS

| | | |
|---|---|---|
| DE | 102009019348 A1 | 11/2010 |
| GB | 2340744 A | 3/2000 |
| JP | 2007153216 A | 6/2007 |
| JP | 2011042295 A | 3/2011 |
| WO | 2006050990 A1 | 5/2006 |
| WO | 2010123503 A1 | 10/2010 |
| WO | WO2013/018630 * | 6/2013 |

* cited by examiner

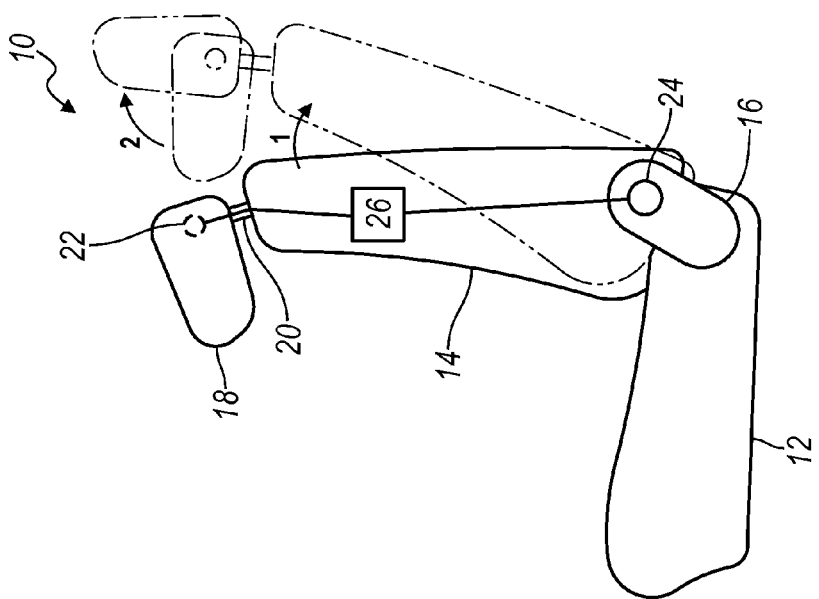
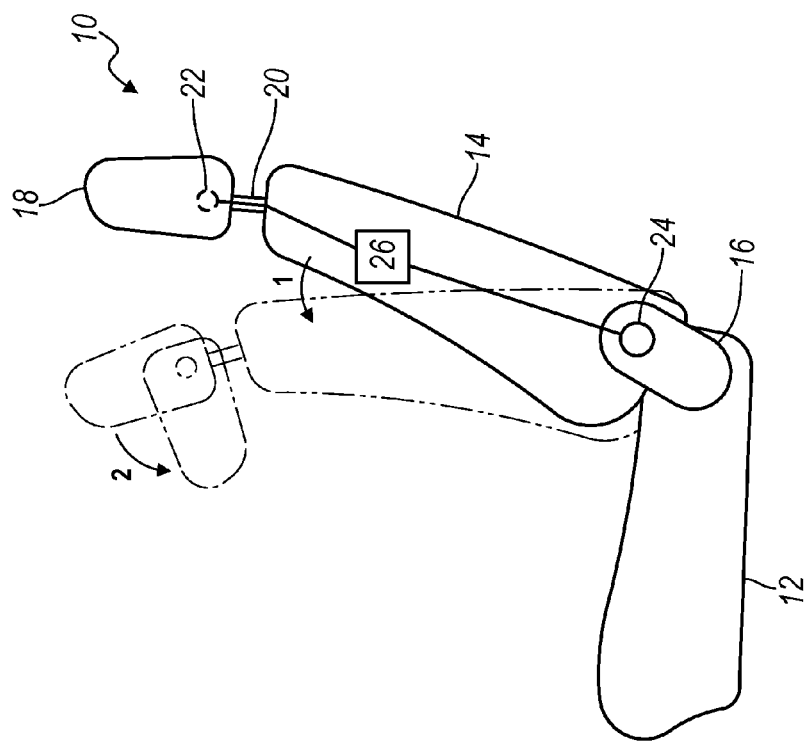

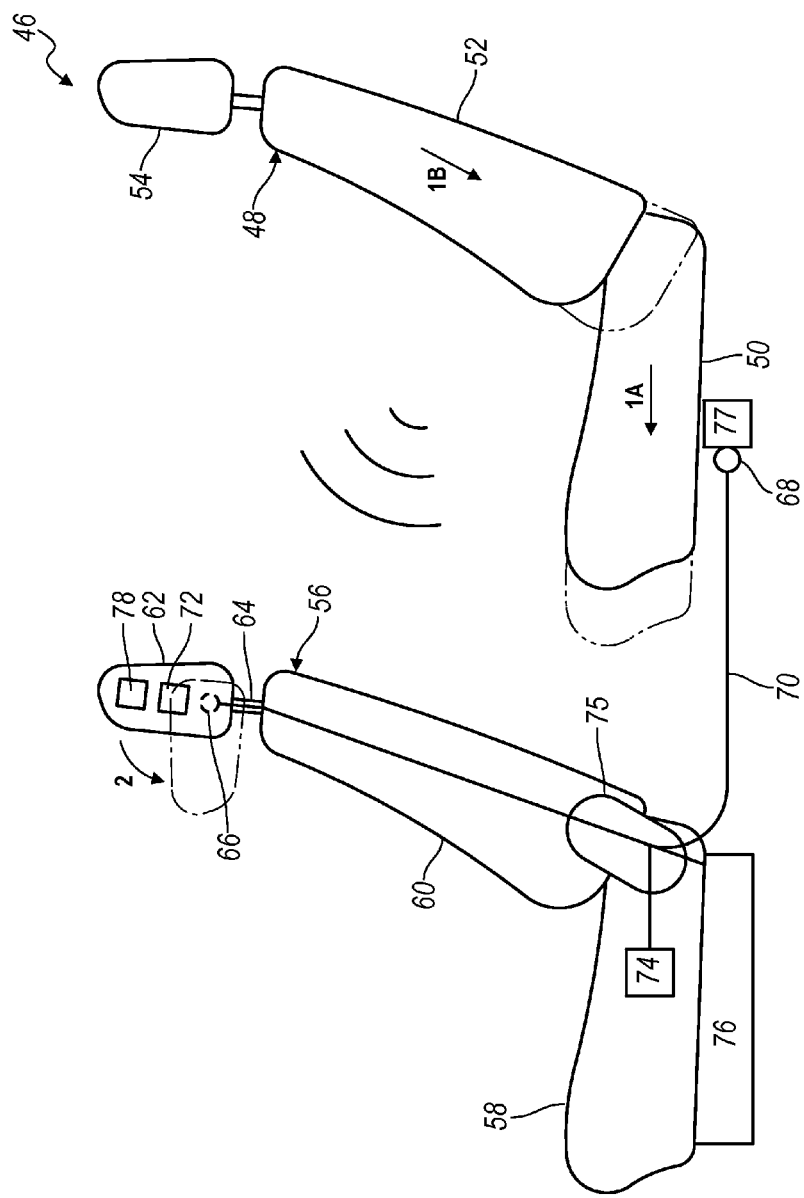

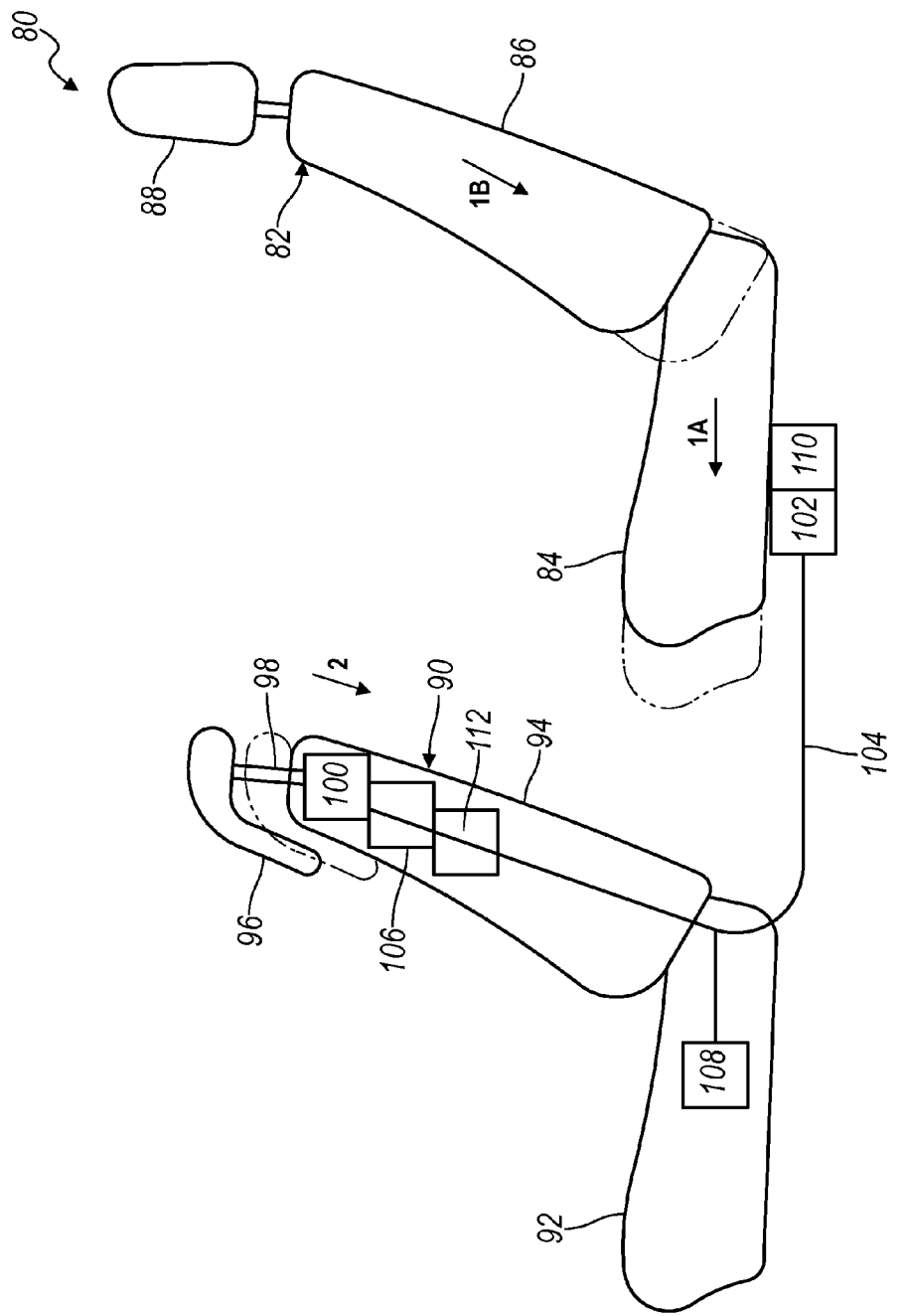

VEHICLE SEAT HEAD RESTRAINT ACTUATION

TECHNICAL FIELD

Various embodiments relate to actuation of head restraints for vehicle seat assemblies.

BACKGROUND

Actuated vehicles seat head restraint assemblies are provided, for example, in International Patent Application Publication Number WO 2010/123503 A1, which published on Oct. 28, 2010.

SUMMARY

According to at least one embodiment, a vehicle seat controller is provided and configured to receive an input indicative of a seat back having pivoted forward to a predetermined position. The vehicle seat controller conveys a signal to an actuator to pivot a head restraint in response to the input.

According to another embodiment, a vehicle seat assembly is provided with a seat bottom adapted to be mounted to a vehicle body. A seat back is adapted to be pivotally connected to the vehicle body adjacent to the seat bottom for pivoting to an upright position and a forward position. An actuator is mounted to the seat back. A head restraint is operably connected to the actuator. A sensor cooperates with the seat back to detect a position of the seat back. A vehicle seat controller is in communication with the sensor and the actuator. The vehicle seat controller is configured to receive an input indicative of the seat back having pivoted forward to a predetermined position. The vehicle seat controller conveys a signal to the actuator to pivot the head restraint in response to the input.

According to another embodiment a vehicle seat controller is provided and configured to receive an input indicative of a seat back having pivoted rearward to a predetermined position. The vehicle seat controller conveys a signal to an actuator to pivot a head restraint in response to the input.

According to yet another embodiment a vehicle seat assembly is provided with a seat bottom adapted to be mounted to a vehicle body. A seat back is adapted to be pivotally connected to the vehicle body adjacent to the seat bottom for pivoting to an upright position and a forward position. An actuator is mounted to the seat back. A head restraint is operably connected to the actuator. A sensor cooperates with the seat back for detecting a position of the seat back. A vehicle seat controller is in communication with the sensor and the actuator. The vehicle seat controller is configured to receive an input indicative of the seat back having pivoted rearward to a predetermined position. The vehicle seat controller conveys a signal to the actuator to pivot the head restraint in response to the input.

According to at least one embodiment a vehicle seat controller is provided and configured to receive an input indicative of a rear seat assembly having adjusted to a slouch position. The vehicle seat controller conveys a signal to an actuator to stow a head restraint of a front seat assembly in response to the input.

According to at least another embodiment a vehicle seating assembly is provided with a rear seat assembly with a rear seat bottom adapted to be operably connected to a vehicle body for adjustment to an upright position and a slouch position. A rear seat back is adapted to be operably connected to the vehicle body adjacent to the seat bottom for adjustment to an upright position and a slouch position. A sensor cooperates with at least one of the rear seat bottom and the rear seat back is in the slouch position. A front seat assembly is provided with a front seat bottom adapted to be mounted to the vehicle body in front of the rear seat assembly. A front seat back is adapted to be mounted to the vehicle body adjacent to the front seat bottom. An actuator is mounted to the front seat back. A head restraint operably is connected to the actuator. A vehicle seat controller is provided in communication with the sensor and the actuator. The vehicle seat controller is configured to receive an input indicative of the rear seat assembly having adjusted to a slouch position. The vehicle seat controller conveys a signal to the actuator to stow the head restraint of the front seat assembly in response to the input.

BRIEF DESCRIPTION OF THE DRAWINGS

FIG. 1 is a schematic illustration of a vehicle seat assembly according to an embodiment, illustrated in an upright position and a stow position;

FIG. 2 is a schematic illustration of a vehicle seat assembly according to another embodiment, illustrated in a stow position and an upright position;

FIG. 5 is a schematic illustration of a vehicle seating assembly according to another embodiment, illustrated with a rear seat assembly in an upright position and a slouch position, and illustrated with a front seat assembly in an upright position and a stow position; and FIG. 6 is a schematic illustration of a vehicle seating assembly according to another embodiment, illustrated with a rear seat assembly in an upright position and a slouch position, and illustrated with a front seat assembly in an upright position and a stow position

DETAILED DESCRIPTION

Figure 3:
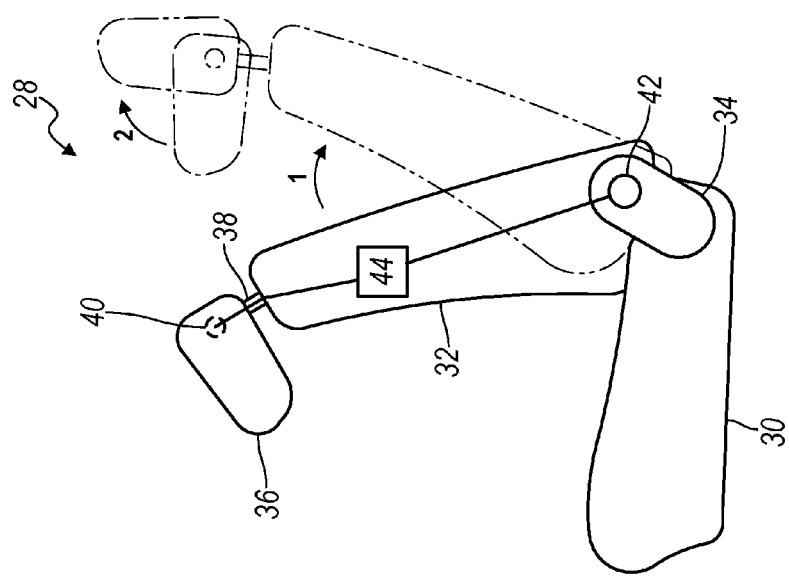
FIG. 3 is a schematic illustration of a vehicle seat assembly according to another embodiment, illustrated in an upright position and a stow position.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIG. 1, a vehicle seat assembly is illustrated according to an embodiment and is reference generally by numeral 10. The vehicle seat assembly 10 is adapted to be mounted to a vehicle body, as is known in the art. The vehicle seat assembly 10 may be installed in any vehicle, for example a land vehicle, such as an automobile. The vehicle seat assembly 10 may also be installed in an aircraft, watercraft, or the like. The vehicle seat assembly 10 may be installed in any suitable seating row, such as a first seating row, a rear seating row, or any intermediate seating row.

The vehicle seat assembly 10 includes a seat bottom 12 that is adapted to be mounted to a vehicle body. The seat bottom 12 may include mounting hardware with or without fore/aft adjustment, as is known in the art. The seat assembly 10 also includes a seat back 14 which is adapted to be pivotally connected to the vehicle body adjacent to the seat bottom 12, as is known in the art. The seat back 14 may be pivotally connected to the seat bottom 12 by a recline mechanism 16, which is also known in the art. Alternatively, the seat back could be pivotally connected to the vehicle body via the recline mechanism 16. The seat back 14 is pivotally adjustable for at least two positions, an upright or seating position as depicted, and a non-use or stow position, which is forward of the upright position.

The vehicle seat assembly 10 includes a head restraint 18 mounted to the seat back 14. For example, the head restraint 18 may be mounted to a pair of posts 20 extending from the seat back 14 for supporting the head restraint 18, and optionally providing height adjustment. The head restraint 18 is also pivotally connected to the seat back 14 for stowing or folding the head restraint 18 when not in use. For example, the head restraint 18 may be pivoted for visual clearance of an occupant seated rear of the seat assembly 10. Alternatively, the head restraint 18 may be pivotally connected to the vehicle body and oriented adjacent the seat back 14.

An actuator 22 is provided between the head restraint 18 and the seat back 14. In one example, the actuator 22 is provided in the head restraint 18 on the posts 20 for actuation of the head restraint 18 relative to the posts 20, and consequently relative to the seat back 14. The actuator 22 may be a spring return mechanism with a manual or automatic release according to at least one embodiment. For the depicted embodiment, the actuator 22 is a powered rotary actuator 22 for dual direction actuation.

A sensor 24 is provided in the vehicle seat assembly 10; and is oriented for example, in the recline mechanism 16 for detecting a predetermined position of the seat back 14. A vehicle seat controller 26 may also be provided in the seat assembly 10, such as in the seat back 14. Alternatively, the controller 26 may be provided as a kernel in a vehicle controller. The controller 26 is in communication with the sensor 24 and the actuator 22. The seat back 14 is pivoted in a direction of arrow 1 manually or powered. Upon detection of the seat back 14 reaching a predetermined position, such as a vertical orientation, the sensor 24 sends a signal to the controller 26 indicating that the seat back 14 has been pivoted forward to the predetermined position. The controller 26 consequently conveys a signal to the actuator 22 with instructions to pivot the head restraint 18 to a stowed or folded position in a direction of arrow 2. Although a generally vertical position is illustrated, the predetermined position could be near vertical or past vertical according to other embodiments. Likewise, the predetermined position may be an intermediate position, whereby the head restraint 18 is folded while the seat back 14 is pivoted from the predetermined position to a final position. According to at least one embodiment, the sensor 24 monitors a direction of travel of the seat back 14, as well as a current status of the head restraint 18 or a current status of the controller 26.

Referring now to FIG. 2, the vehicle seat assembly 10 is illustrated during a return to an upright position. As the seat back 14 is pivoted in a direction of arrow 1, the sensor 24 detects when the seat back 14 reaches another predetermined position, such as vertical, near vertical or beyond vertical. The sensor 24 sends a signal to the controller 26 indicating that the seat back 14 has reached the predetermined rearward position. The controller 26 issues a signal to the actuator 22 with instructions to return the head restraint 18 to an upright or use position. Consequently, the actuator 22 pivots the head restraint 18 in the direction of arrow 2.

FIG. 3 illustrates a vehicle seat assembly 28 according to another embodiment. The seat assembly 28 includes a seat bottom 30, a seat back 32 extending from the seat bottom 30, and pivotally attached at a recline mechanism 34. A head restraint 36 is pivotally connected to posts 38 extending from the seat back 32. An actuator 40 is connected to the head restraint 36. A sensor 42 is provided in the recline mechanism 34. A controller 44 is in communication with the sensor 42 and the actuator 40.

When the seat back 32 is pivoted forward in a direction of arrow 1, the sensor 42 detects when the seat back 32 reaches a non-use or stowed position beyond vertical, which may be fully forward. The sensor 42 informs the controller 44, which instructs the actuator 40 to pivot the head restraint 36 forward in the direction of arrow 2.

Figure 4:
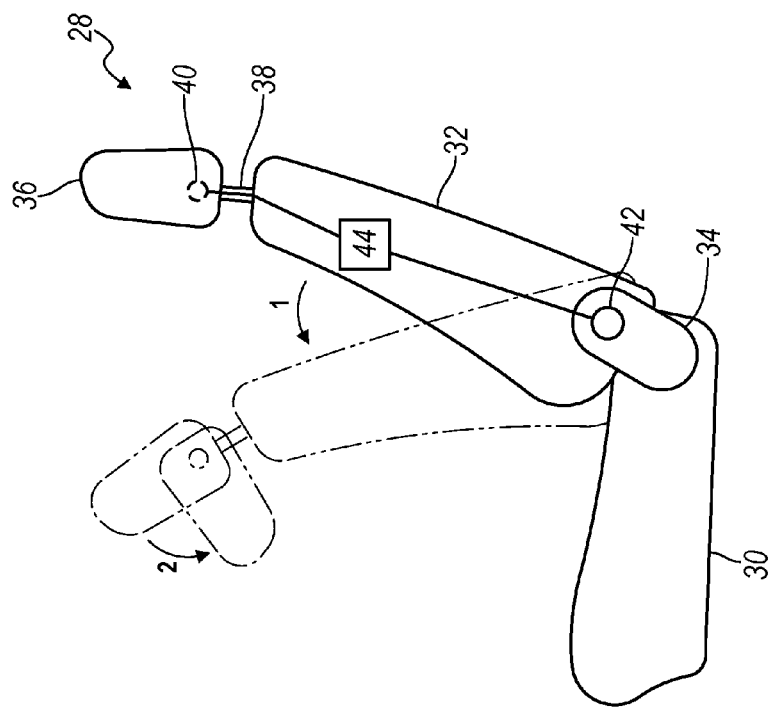
FIG. 4 is a schematic illustration of a vehicle seat assembly according to another embodiment, illustrated in a stow position and an upright position.

In FIG. 4, the seat back 32 is pivoted rearward in a direction of arrow 1. Upon reaching a use position or fully rearward, the sensor 42 informs the controller 44. The controller 44 instructs the actuator 40 to pivot the head restraint 36 in a direction of arrow 2 to an upright or use position.

FIG. 5 illustrates a vehicle seating assembly 46 according to another embodiment. The seating assembly 46 includes a rear seat assembly 48 with a seat bottom 50 adapted to be operably connected to a vehicle body for adjustment to an upright and a slouch position. The seat assembly 48 also includes a seat back 52 operably connected to the vehicle body adjacent to the seat bottom 50 for adjustment to an upright position and a slouch position. A head restraint 54 is supported upon the seat back 52.

Upright and slouch positions do not refer literally to an orientation of the seat bottom 50 and the seat back 52. These positions refer to a position obtained by an occupant due to relative positioning of the seat back 52 and the seat bottom 50 relative to each other. For example, the rear seat assembly 48 is illustrated in the upright position in FIG. 5. To obtain the slouch position, the seat bottom 50 is translated along arrow 1A such that the seat bottom 50 is no longer under the seat back 52. Concurrently, the seat back 52 is translated downward along arrow 1B to lower the seat back 52 relative to the seat bottom 50. According to at least one embodiment, the seat back 52 is connected to the seat bottom 50 to translate forward along arrow 1A with the seat bottom 50; and to translate downward along arrow 1B relative to the seat bottom 50. The lowered orientation of the seat back 52 in combination with the seat bottom 50 translated forward of the seat back 52 provides a comfort or slouch position for the occupant. Of course, various arrangement combinations of the seat bottom 50 and seat back 52 may be employed for generating a slouch position.

The vehicle seating assembly 46 includes a front seat assembly 56 with a seat bottom 58 adapted to be mounted to the vehicle body in front of the rear seat assembly 48. The front seat assembly 56 includes a seat back 60 adapted to be mounted to the vehicle body adjacent to the front seat bottom 58. A head restraint 62 is pivotally connected to the seat back 60 by, for example, a pair of posts 64. An actuator 66 cooperates with the head restraint 62 for pivoting the head restraint 62. The actuator 66 may be provided on the posts 64.

A sensor 68 is provided on the rear seat bottom 50 for detecting when the rear seat bottom 50 is translated to the slouch position. Alternatively, the sensor 68 can be provided on the rear seat back 52. The sensor 68 is connected to a wire harness 70 for conveying communication signals from the rear seat assembly 48 to the front seat assembly 56. The wire harness 70 can extend to the front seat bottom 58, through the front seat back 60 (via a connector or connectors), through one of the posts 64, and into the front head restraint 62.

A vehicle seat controller 72 may be provided in the front head restraint 62 in communication with the sensor 68 through the wire harness 70, and in communication with the actuator 66. Alternatively, the controller 72 can be provided anywhere in the seating assembly 46, or as a kernel in the vehicle controller. Upon receipt of a signal indicating that the rear seat assembly 48 is adjusted to the slouch position, the controller 72 instructs the actuator 66 to pivot the front head restraint 62 in a direction of arrow 2 to a stowed position. The controller 72 may also be in communication with a vehicle seat occupancy switch 74 to prevent actuation of the head restraint 62 to the stowed position when the front seat assembly 56 is occupied by a passenger. The controller 72 may also be in communication with a recline actuator 75 for pivoting the seat back 60 forward for providing additional room to the rear occupant. The controller 72 may also be in communication with a seat track actuator 76 for sliding the front seat assembly 56 forward for providing additional room to the rear occupant.

According to another embodiment the vehicle seating assembly 46 may be provided without the wire harness 70. A transmitter 77 is provided in communication with the sensor 68 instead. The transmitter 77 is configured to transmit wireless communication signals. A receiver 78 is provided in the front seat assembly 56 and is oriented in the head restraint 62, for example. The receiver 78 is configured to receive wireless communication signals. The receiver 78 is in communication with the controller 72 for conveying the signal from the sensor 68 without the wire harness 70. Upon receipt of the signal indicating that the rear seat assembly 48 is adjusted to the slouch position, the controller 72 instructs the actuator 66 to pivot the front head restraint 62 in the direction of arrow 2 to the stowed position. The controller 72 may also be in communication with the vehicle seat occupancy switch 74 to prevent actuation of the head restraint 62 to the stowed position when the front seat assembly 56 is occupied by a passenger.

FIG. 6 illustrates another vehicle seating assembly 80 according to an embodiment. The seating assembly 80 includes a rear seat assembly 82 with a seat bottom 84, a seat back 86, and a head restraint 88. To obtain a slouch position, the seat bottom 84 is translated along arrow 1A, and the seat back 86 is translated downward along arrow 1B. The vehicle seating assembly 80 includes a front seat assembly 90 with a seat bottom 92, a seat back 94, and a head restraint 96. The head restraint 96 is connected to the seat back 94 by a pair of posts 98. An actuator 100 is provided in the seat back 94, connected to the posts 98 to extend or retract the head restraint 96. Alternatively, the actuator 100 can be provided in the head restraint 96 and connected to the posts 98 for translating the head restraint 96 along the posts 98.

A sensor 102 is provided on the rear seat bottom 84 for detecting when the rear seat bottom 84 is translated to the slouch position. The sensor 102 is connected to a wire harness 104, which extends to a vehicle seat controller 106, which is also in communication with the actuator 100. Upon receipt of a signal indicating that the rear seat assembly 82 is adjusted to the slouch position, the controller 106 instructs the actuator 100 to translate the front head restraint 96 in a direction of arrow 2 to a stowed position. The controller 106 may also be in communication with a vehicle seat occupancy switch 108 to prevent actuation of the head restraint 96 to the stowed position when the front seat assembly 90 is occupied by a passenger.

According to another embodiment the vehicle seating assembly 80 may be provided with a transmitter 110 in communication with the sensor 102 instead of the wire harness 104. A receiver 112 is provided in the front seat assembly 90 to receive wireless communication signals. The receiver 112 is in communication with the controller 106 for conveying the signal from the sensor 102.

The various embodiments improve vision for a rear seated occupant. Unlike the prior art, these systems do not require a rear passenger to buckle his/her seatbelt in order to operate. Alternatively, the front seat head restraint actuation may be remotely controlled by a switch provided on an armrest of a rear seating position.

The various seat assembly controllers from the various embodiments may be embodied in a module within the corresponding seat assembly, or any controller; each of which may generally include any number of microprocessors, ASICs, ICs, memory (e.g., FLASH, ROM, RAM, EPROM, and/or EEPROM) which co-act with software code to perform the operations.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat assembly comprising:
a seat bottom adapted to be mounted to a vehicle body;
a seat back adapted to be pivotally connected to the vehicle body adjacent to the seat bottom for pivoting to an upright position and a forward position;
an actuator mounted to the seat back;
a head restraint operably connected to the actuator;
a sensor cooperating with the seat back to detect a position of the seat back; and
a vehicle seat controller in communication with the sensor and the actuator, the vehicle seat controller being configured to:
receive a first input indicative of the seat back having pivoted forward to a predetermined position,
convey a first signal to the actuator to pivot the head restraint to a folded position in response to the first input for visual clearance of an occupant seated rear of the seat assembly,
receive a second input indicative of the seat back having pivoted rearward to a second predetermined position, and
convey a second signal to the actuator to pivot the head restraint in response to the second input.

2. The vehicle seat assembly of claim 1 wherein the predetermined position is further defined as a vertical orientation of the seat back.

3. The vehicle seat assembly of claim 1 wherein the predetermined position is further defined as a position beyond a vertical orientation of the seat back.

4. The vehicle seat assembly of claim 1 wherein the predetermined position is further defined as a non-use position.

5. The vehicle seat assembly of claim 1 wherein the predetermined position is further defined as a fully forward position.

6. The vehicle seat assembly of claim 1 wherein the actuator pivots the head restraint forward in response to the first signal.

7. The vehicle seat assembly of claim 1 wherein the second predetermined position is further defined as a vertical orientation of the seat back.

8. The vehicle seat assembly of claim 1 wherein the second predetermined position is further defined as a position beyond a vertical orientation of the seat back.

9. The vehicle seat assembly of claim 1 wherein the second predetermined position is further defined as a use position.

10. The vehicle seat assembly of claim 1 wherein the second predetermined position is further defined as a fully rearward position.

11. The vehicle seat assembly of claim 1 wherein the actuator pivots the head restraint rearward in response to the second signal.

\* \* \* \* \*